(12) United States Patent
Grigor et al.

(10) Patent No.: US 7,554,510 B1
(45) Date of Patent: Jun. 30, 2009

(54) METHOD AND APPARATUS FOR CONFIGURING MULTIPLE DISPLAYS ASSOCIATED WITH A COMPUTING SYSTEM

(75) Inventors: Gordon Fraser Grigor, Toronto (CA); Vladimir F. Giemborek, Richmond Hill (CA); John E. Haberfellner, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 09/032,863

(22) Filed: Mar. 2, 1998

(51) Int. Cl.
*G09G 5/00* (2006.01)
*G06F 13/14* (2006.01)

(52) U.S. Cl. .................... 345/3.1; 345/3.3; 345/519; 345/502

(58) Field of Classification Search ............... 345/1, 345/2, 3, 508, 520, 521, 522, 509, 903, 1.1–3.4, 345/519, 502, 545, 546, 629, 501, 698, 699; 348/383
See application file for complete search history.

(56) References Cited

U.S. PATENT DOCUMENTS

| | | | |
|---|---|---|---|
| 4,870,406 A | | 9/1989 | Gupta et al. |
| 4,980,678 A | * | 12/1990 | Zenda ........................ 340/716 |
| 4,990,902 A | * | 2/1991 | Zenda ........................ 340/731 |
| 4,990,904 A | * | 2/1991 | Zenda ........................ 340/771 |
| 5,018,076 A | | 5/1991 | Johary et al. |
| 5,107,251 A | | 4/1992 | Frank et al. |
| 5,140,687 A | | 8/1992 | Dye et al. |
| 5,218,274 A | * | 6/1993 | Zenda ........................ 315/366 |
| 5,218,699 A | | 6/1993 | Brandle et al. |
| 5,247,676 A | | 9/1993 | Ozur et al. |
| 5,283,856 A | | 2/1994 | Gross et al. |
| 5,285,192 A | * | 2/1994 | Johary et al. ................. 345/3.4 |
| 5,293,485 A | * | 3/1994 | Zenda ........................ 395/164 |
| 5,321,423 A | | 6/1994 | Yoshizawa et al. |
| 5,361,078 A | * | 11/1994 | Caine ............................ 345/1 |
| 5,388,200 A | | 2/1995 | McDonald et al. |

(Continued)

OTHER PUBLICATIONS

N. Thompson, "Ride the WinG for Speedy Graphics", MSDN, Sep. 1994, pp. (4).

(Continued)

*Primary Examiner*—Kevin M Nguyen
(74) *Attorney, Agent, or Firm*—Vedder Price P.C.

(57) ABSTRACT

A method and apparatus for configuring multiple displays associated with a computing system begins when display preferences regarding at least one of the multiple displays are received. The display preferences indicate desired selections of which images are to be displayed on which displays and may be based on user selections or application selections. Having received the display preferences, a coupling controller within a video graphics processing circuit determines whether the display preferences can be fulfilled in observance of configuration properties. The configuration properties include limitations of the displays (e.g., refresh rate, resolution) and the computing system (e.g., display controller capabilities) and/or rules of the computing system (e.g., at least one screen must be actively coupled at all times). If the display preferences can be fulfilled, the coupling controller causes display controllers to be operably coupled to displays. If, however, the display preferences cannot be fulfilled, the coupling controller determines whether the current configuration can be reconfigured to allow the display preferences to be fulfilled with minimal affect on the perceived current configuration. If so, the coupling controller causes the video graphics processing circuitry to be reconfigured.

27 Claims, 4 Drawing Sheets

U.S. PATENT DOCUMENTS

| | | | |
|---|---|---|---|
| 5,420,980 A | | 5/1995 | Pinedo et al. |
| 5,430,457 A | * | 7/1995 | Zenda ........................... 345/3 |
| 5,432,900 A | | 7/1995 | Rhodes et al. |
| 5,508,714 A | * | 4/1996 | Zenda ........................... 345/3 |
| 5,559,525 A | * | 9/1996 | Zenda ........................... 345/1 |
| 5,564,009 A | | 10/1996 | Pinedo et al. |
| 5,574,836 A | | 11/1996 | Broemmelsiek |
| 5,581,766 A | | 12/1996 | Spurlock |
| 5,592,187 A | * | 1/1997 | Zenda ........................... 345/3 |
| 5,629,715 A | * | 5/1997 | Zenda ........................... 345/3 |
| 5,694,141 A | * | 12/1997 | Chee .......................... 345/3.1 |
| 5,696,947 A | | 12/1997 | Johns |
| 5,745,762 A | | 4/1998 | Celi et al. |
| 5,764,201 A | * | 6/1998 | Ranganathan ............... 345/3.3 |
| 5,764,228 A | | 6/1998 | Baldwin |
| 5,784,035 A | | 7/1998 | Hagiwara et al. |
| 5,801,720 A | | 9/1998 | Norrod et al. |
| 5,835,090 A | | 11/1998 | Clark et al. |
| 5,838,334 A | | 11/1998 | Dye |
| 5,841,418 A | * | 11/1998 | Bril et al. ....................... 345/3 |
| 5,841,435 A | | 11/1998 | Dauerer et al. |
| 5,870,108 A | | 2/1999 | Chen et al. |
| 5,874,928 A | * | 2/1999 | Kou ............................... 345/1 |
| 5,923,307 A | * | 7/1999 | Hogle, IV ...................... 345/4 |
| 5,929,868 A | | 7/1999 | Howard et al. |
| 5,949,437 A | | 9/1999 | Clark |
| 5,963,192 A | * | 10/1999 | Wong et al. ................. 345/519 |
| 5,982,384 A | | 11/1999 | Prouty et al. |
| 5,990,912 A | | 11/1999 | Swanson |
| 6,018,340 A | | 1/2000 | Butler et al. |
| 6,020,863 A | * | 2/2000 | Taylor ........................... 345/3 |
| 6,046,753 A | | 4/2000 | Searby et al. |
| 6,049,316 A | * | 4/2000 | Nolan et al. ................... 345/1 |
| 6,061,064 A | | 5/2000 | Reichlen |
| 6,091,432 A | | 7/2000 | Diehl et al. |
| 6,097,401 A | | 8/2000 | Owen et al. |
| 6,104,359 A | | 8/2000 | Endres et al. |
| 6,104,414 A | * | 8/2000 | Odryna et al. .............. 345/509 |
| 6,154,225 A | * | 11/2000 | Kou et al. ................... 345/519 |
| 6,239,810 B1 | | 5/2001 | Van Hook et al. |
| 6,240,468 B1 | | 5/2001 | Capelli |
| 6,297,817 B1 | | 10/2001 | Larson et al. |
| 6,351,261 B1 | | 2/2002 | Reichlen et al. |
| 6,411,302 B1 | | 6/2002 | Chiraz |
| 6,510,470 B1 | | 1/2003 | Capelli |
| 6,573,913 B1 | | 6/2003 | Butler et al. |
| 6,597,364 B1 | | 7/2003 | Chiu et al. |
| 6,667,745 B1 | | 12/2003 | Hussain |
| 6,823,535 B2 | | 11/2004 | Martyn |
| 6,853,381 B1 | | 2/2005 | Grigor et al. |
| 2005/0050554 A1 | | 3/2005 | Martyn |

OTHER PUBLICATIONS

S. Diehl, "Window 95 Graphics Architecture", BYTE magazine, Jun. 1995, pp. (4).

Civaniar et al., "Image Processing Performance Evaluation for DSP Based Parallel Computers with Distributed Frame Buffers", 1990 IEEE, pp. 993-996.

* cited by examiner

METHOD AND APPARATUS FOR CONFIGURING MULTIPLE DISPLAYS ASSOCIATED WITH A COMPUTING SYSTEM

TECHNICAL FIELD OF THE INVENTION

The present invention relates generally to computers and their associated displays and more particularly to multiple displays associated with a computer.

BACKGROUND OF THE INVENTION

Computers are known to include a central processing unit, system memory, video graphics circuitry, audio processing circuitry, and peripheral ports. The peripheral ports provide connectivity between the computer and peripheral devices, such as printers, displays, tape drives, and other external memory devices. As is known, displays provide computer users with a visual representation of computer applications (e.g., word processing, drawing, games, TV tuner, etc.) that are being executed by the computer. As the computer executes the computer applications, the central processing unit provides processed data to the video graphics circuitry.

The video graphics circuitry receives the processed data, converts it into display ready data, and provides the display ready data to the display at the appropriate time and rate. For example, if the computer is processing a word processing application and the display is a CRT display having a refresh rate of sixty, the video graphics circuitry converts the processed data into RGB (Red, Green, Blue) pixel data, which may be 8, 16, or 32 bits/pixel, and stores it in a frame buffer, or screen memory. The video graphics circuitry retrieves the stored RGB pixel data from the frame buffer and provides it to the CRT display at the refresh rate.

In the above-described example, the video graphics circuitry is coupled to one display device, which is typical in most computer applications. As such, the video graphics circuitry is dedicated to a single display device. Many computers, however, include an additional monitor port such that two displays may be driven from a single video graphics card. While this allows two displays to be driven from a single video graphics card, both displays will display the same image. In addition, both displays must have the same refresh rate and resolution (e.g., 640 by 480 pixel screen size). If a computer user desires that the two displays display different images, the computer needs to include two video graphics cards While the two separate video graphics cards allow for two displays to display different images, the video graphics cards are essentially dedicated to their respective displays. In other words, each video graphics card is hard wired to a display port, which couples to one of the two displays. Thus, to change which video graphics card is driving which display, the physical connection or motherboard location of the video graphics card would need to be changed. If the displays are substantially the same, dedicated coupling to one video graphics card or the other does not affect the quality of the images being displayed. If, however, the displays are not the same (e.g., one is an LCD display and the other is a CRT monitor), image quality may vary. Thus, it would be desirable to provide images requiring a higher quality to the display capable of providing the desired quality and to provide images requiring less quality to the display having a lower quality. If the computer user knows which images require higher quality, the user can insure that the images will be processed by the appropriate video graphics card and thus displayed on the desired display. If not, the images may be displayed on the display having the lower quality.

Therefore, a need exists for a method and apparatus that provides for multiple displays to be coupled to a computer without requiring the computer to include a dedicated video graphics card for each display and provides programmable controller.

DETAILED DESCRIPTION OF A PREFERRED EMBODIMENT

Generally, the present invention provides a method and apparatus for configuring multiple displays associated with a computing system. The configuring begins when display preferences regarding at least one of the multiple displays are received. The display preferences indicate desired selections of which images are to be displayed on which displays and may be based on user selections or application selections. Having received the display preferences, a coupling controller within a video graphics processing circuit determines whether the display preferences can be fulfilled in observance of configuration properties. The configuration properties include limitations of the displays (e.g., refresh rate, resolution) and the computing system (e.g., display controller capabilities) and/or rules of the computing system (e.g., at least one screen must be actively coupled at all times). If the display preferences can be fulfilled, the coupling controller causes display controllers to be operably coupled to displays. If, however, the display preferences cannot be fulfilled, the coupling controller determines whether the current configuration can be reconfigured to allow the display preferences to be fulfilled with minimal affect on the perceived current configuration. If so, the coupling controller causes the video graphics processing circuitry to be reconfigured. With such a method and apparatus, a single video graphics card can be used to drive multiple displays. In addition, the present invention provides a dynamic coupling of displays to display controllers such that image quality can be optimized, user preferences can be accommodated, and application preferences can be accommodated.

Figure 1:
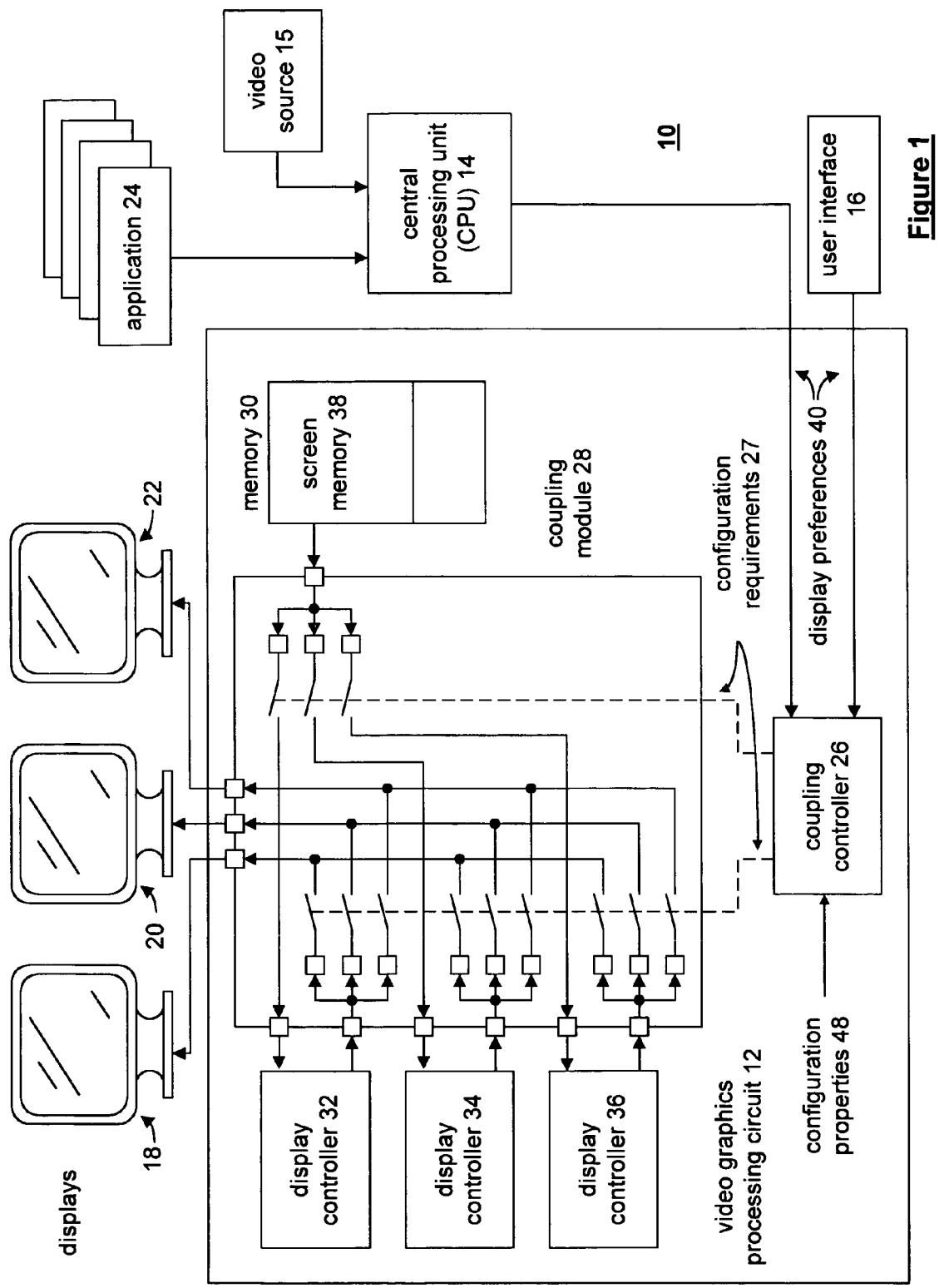
FIG. 1 illustrates a schematic block diagram of a computing system in accordance with the present invention.

The present invention can be more fully described with reference to FIGS. 1 through 4. FIG. 1 illustrates a schematic block diagram of a computing system 10 that includes a video graphics processing circuit 12, a central processing unit (CPU) 14, a video source 15, a user interface 16, multiple displays 18-22, and a plurality of applications 24. The CPU 14 may be any central processing unit of a personal computer, laptop computer, workstation, personal digital assistant, or any computing device. The user interface 15 may be a graphical user interface, a touch screen, a keyboard, or any other means for providing user inputs to the computing system 10. The video source 15 may be a television tuner, video cassette player or recorder, DVD player, satellite receiver, or cable box. The displays 18-22 may be CRT monitors, televisions, LCD panel displays, or any combination thereof. The applications 24 may be any application that the CPU, and/or a co-processor (not shown), may execute. For example, the applications 24 may be, but not limited to, word processing applications, Internet access applications, drawing applications, presentation applications, scheduling applications, video source applications, and specialty applications (e.g., typing instruction applications, legal forms applications, etc.).

The video graphics processing circuit 12 includes a coupling controller 26, a coupling module 28, memory 30, and a plurality of display controllers 32-36. The coupling controller 26 may be a software module that receives display preferences 40 from the user interface 16 and/or the CPU 14. The display preferences 40 include preferences as to how the user and/or a specific application running on the CPU 14 would like images from various sources to be displayed on which display 32-36. The display preferences 40 include: (i) displaying an image (i.e., the same image) on more than one of the multiple displays; (ii) displaying separate images on each of the multiple displays (e.g., a video image from a television tuner on one display and an application running on the CPU 14 on another display); (iii) displaying a portion of the image on one of the multiple displays and displaying the image on another one of the multiple displays (e.g., having one display supporting a full screen of a drawing applications and the other display supporting the toolbars); (iv) providing different refresh rates for at least two of the multiple displays; (v) providing different resolutions for at least two of the multiple displays; (vi) selecting a particular one of the multiple displays to display a particular type of image (e.g., have the television display images from the video source 15, having the CRT display supporting applications requiring high resolution, and an LCD display supporting applications requiring less resolution); and (vii) displaying a first portion of the image on a first one of the multiple displays and displaying a second portion of the image on a second one of the multiple displays (e.g., page one of a document on one display and page two of the document on another display).

Upon receiving the display preferences 40, the coupling controller 26 determines whether the display preferences 40 can be fulfilled in observance of configuration properties 48. The configuration properties 48 include properties of the multiple displays and properties of the computing system 10. The configuration properties 48 of a display include limitations of the display such as refresh rate, resolution, type of display (e.g., television, CRT display, LCD display), etc. The configuration properties 48 of the computing system relate to the capabilities of the display controllers 32-36. For example, the configuration properties include one display controller supports a television, another display controller supports a dual scan LCD display, yet another display controller supports lower refresh rate and/or resolution CRT displays, and still another display controller supports high resolution and/or high refresh rate displays. The operational rules of the computing system include rules established by the computing system manufacturer that insure a certain level of performance. For example, the rules may include a stipulation that at least one display needs to be active at any given time and/or a stipulation that a certain one of the display controllers cannot be coupled to a particular display.

If the display preferences can be fulfilled, the coupling controller provides configuration requirements 27 to the coupling module 28. The coupling module 28 effectively closes "switches" such that the desired display controller 32-36 is coupled to one or more of the displays 18-22. In addition, the coupling module closes one or more "switches" such that one or more of the display controllers 32-36 is coupled to retrieve display data from the screen memory 38. For example, if the same image is to be identically displayed on displays 18 and 20 and display controller 32 is to support them, the top "switch" associated with an output of the screen memory 38 is closed and the top two "switches" associated with the output of display controller 32 are closed.

As another example, assume that the same image is to be displayed on different displays 18 and 20, but are to be under separate control such that they may be presented in a different manner (e.g., at a different resolution, one display is displaying a portion of the image while the other screen is displaying the whole image, or one display is displaying a first portion of an image and the other is displaying a second portion of the image). In this example, two of the "switches" associated with the output of the screen memory 38 are closed, coupling the input of display controllers 32 and 34 to the screen memory 38. The top "switch" associated with the output of display controller 32 is closed to couple display controller 32 to display 18. Also, the top "switch" associated with the output of display controller 34 is closed coupling display controller 34 to display 20. As one of average skill in the art will appreciate, the display controllers 32-36, the screen memory 38, and the displays 18-22 may be coupled in any of a plurality of configurations.

If the display preferences cannot be fulfilled, the coupling controller 26 determines whether the current configuration can be reconfigured to fulfill the display preferences and to maintain the effective current configuration. For example, if display 18 is a high resolution display and is currently coupled to display controller 32 and the display preferences desires to have display controller 32 support display 20, the coupling controller 26 will determine whether one of the other display controllers is capable of supporting display 18. If so, the coupling controller 26 reconfigures the computing system, in particular, the video graphics processing circuit 12 such that display controller 32 is supporting display 20 and one of the other display controllers 34 or 36 is supporting display 18. To the computer user, the reconfiguration is made with minimal, or no, adverse visual affects to the images being displayed. If, however, the display preferences cannot be fulfilled, the coupling controller 26 provides an error, or denial, message.

The video graphics processing circuit 12 has thus far been primarily discussed in terms of its function. The physical implementation of the video graphics processing circuit 12 is equally as flexible. For example, the display controllers 32-36 may be included in a single adapter, or graphics chip, or each display controller 32-36 may be included on a separate graphics chip. Regardless of how the display controllers 32-36 are packaged, they are included on a single video graphics card. In general, the display controllers 32-36 retrieve display data from the screen memory 38 and provide it to the appropriate display 18-22. The display controllers 32-36 are similar to those used in the All-In-Wonder video product manufactured and distributed by ATI Technologies, Inc.

The memory 30 may be random access memory, cache memory, floppy disk memory, hard disk memory, DVD memory, magnetic tape memory, and/or any other means for storing digital information. In addition, the memory 30 may be memory on the video graphics processing circuit 12, system memory of the computing system, and/or any memory that can be coupled to the computing system and accessed by the video graphics processing circuit 12. The screen memory 38, as previously mentioned, stores display data. The type of display data varies depending on the capabilities of the displays 18-22. For example, the display data for a CRT display is RGB pixel data that may be 8, 16, or 32 bits/pixel. The display data for a television is YUV or Y, Cr, Cb data. The display data for an LCD display is 3 bit/pixel RGB pixel data that is stored in a dual scan mode.

The coupling module 28 is shown to include a plurality of "switches". If the coupling module 28 is implemented in hardware, the "switches" will be physical switches, or the like, to provide the connectivity between the screen memory 38, the display controllers 32-36, and the displays 18-22. If, however, the coupling module 28 is implemented in software, the "switches" are implemented as registers that indicate the connectivity between the screen memory 38, the display controllers 32-36, and the displays 18-22. As one of average skill in the art will appreciate, the coupling module 28 may be further implemented as a combination of software and hardware.

Figure 2:
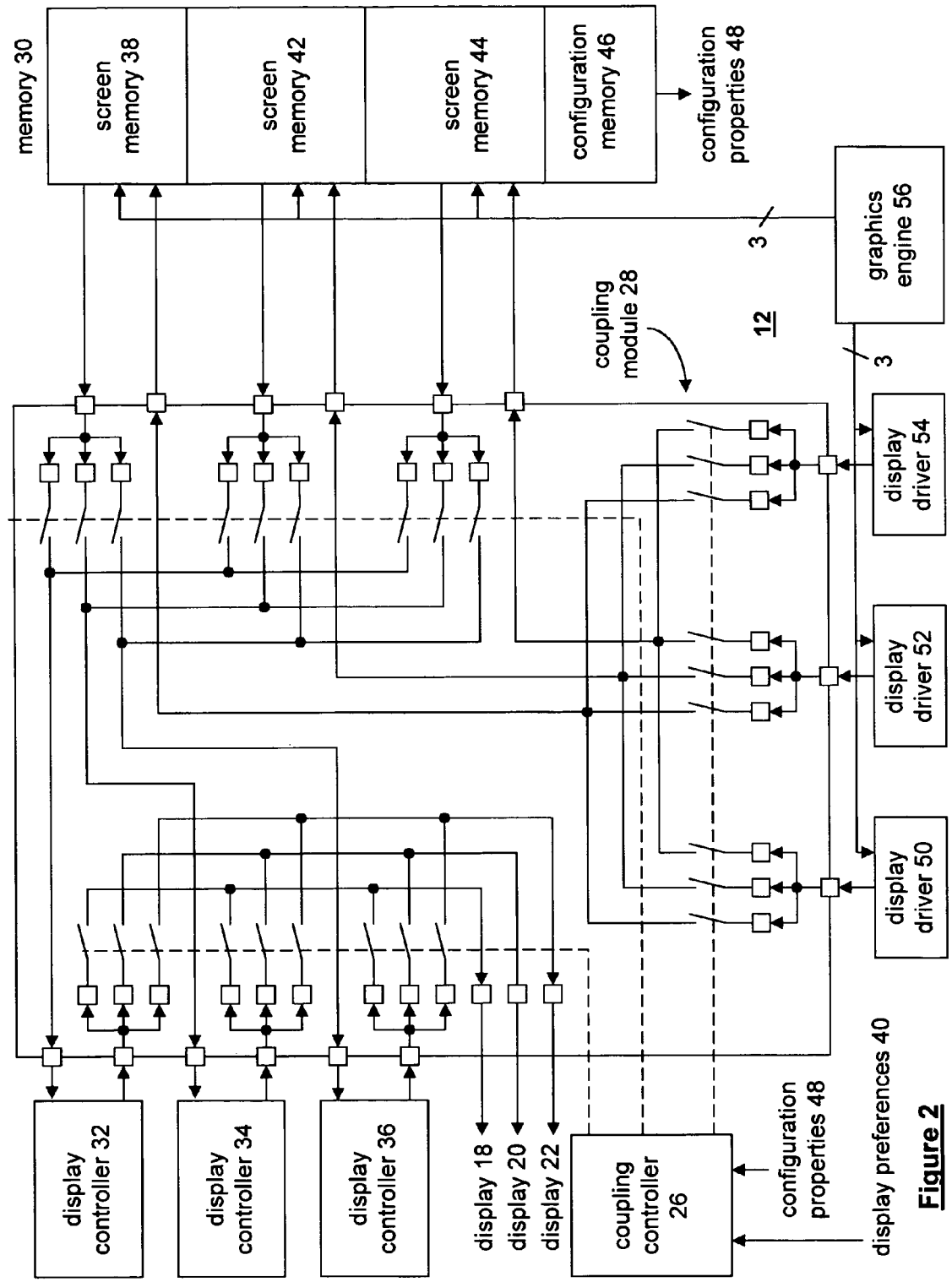
FIG. 2 illustrates a schematic block diagram of a video graphics processing circuit of the computing system of FIG. 1.

FIG. 2 illustrates a schematic block diagram of the video graphics processing circuit 12 that includes the coupling controller 26, the coupling module 28, the memory 30, the display controllers 32-36, a plurality of display drivers 50-54, and a graphics engine 56. The memory 30 includes a plurality of screen memory sections 38, 42, 44 and configuration memory 46, which stores the configuration properties 48. As such, one screen memory section may store display data for a television, another screen memory may store display data for a CRT display, and yet another screen memory may stored display data for an LCD display. Alternatively, the screen memory sections may be storing display data of the same image, but with different RGB data (i.e., 8, 16, or 32 bit/pixel). As another alternative, the screen memory sections may be storing different windows, etc. As one of average skill in the art, the screen memory sections may store display data in any number of combinations.

The display drivers 50-54 and the graphics engine 56 function in a similar manner to similar devices in the All-In-Wonder video graphics product manufactured and distributed by ATI Technologies, Inc. In general, the display drivers 50-54 write the display data into coupled screen memories 38, 42, 44 in association with the graphics engine 56.

As shown, the coupling module 28 includes a plurality of "switches" that provides numerous configuration possibilities. The output of each element (i.e., the display controllers, the screen memories, and the display drivers) is coupled to three "switches". This allows the output of an element to supply data to one, two, or all three of the receiving elements (i.e., the displays, the display controllers, and the screen memories). For example, the display drivers 50-54 may be configured such that one display driver writes the display data to all three of the screen memories, that one display driver writes to two screen memories and another writes to the third screen memory, that each of the display drivers writes to a separate screen memory, or that a display driver writes to only one or two of the screen memories (i.e., not all of the screen memories are used). The options for coupling the display controllers 32-36 to the displays 18-22 and coupling the screen memories 38, 42, 44 to the display controllers 32-36 are equally as numerous. As one of average skill in the art will appreciate, the number of display drivers, display controllers, and screen memories can vary from the three shown, which was selected for illustration purposes only, and that the number of display controllers, display drivers, and screen memories do not have to match.

Figure 3:
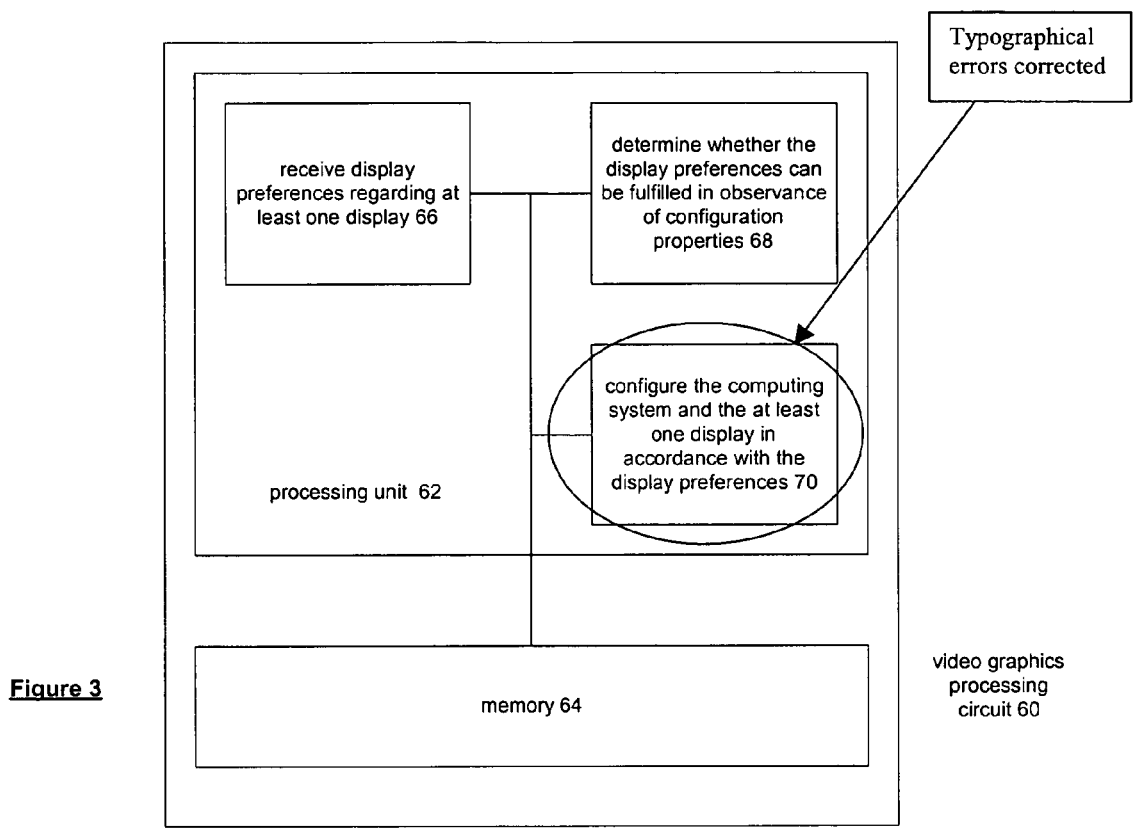
FIG. 3 illustrates a schematic block diagram of an alternate video graphics processing circuit of the computing system of FIG. 1.

FIG. 3 illustrates a schematic block diagram of an alternate video graphics processing circuit 60 that includes a processing unit 62 and memory 64. The processing unit 62 may be a microprocessor, microcontroller, microcomputer, digital signal processor, central processing unit, and/or any device(s) that manipulates digital information based on programming instructions. The memory 64 may be read only memory, random access memory, floppy disk memory, hard disk memory, magnetic tap memory, DVD memory, CD memory, and/or any means for storing digital information.

The memory 64 stores programming instructions that, when executed by the processing unit 62, cause the processing unit 62 to function as a plurality of circuits 66-70. While executing the programming instructions, the processing unit functions as circuit 66 that receives display preferences regarding at least one display. The processing unit 62 then functions as circuit 68 that determines whether the display preferences can be fulfilled in observance of configuration properties. If so, the processing unit 62 functions as circuit 70 that configures the computing system and the at least one display in accordance with the display preferences. The programming instructions stored in memory 64, which may be a separate memory device, and the execution thereof by the processing unit 62 will be discussed in greater detail with reference to FIG. 4.

Figure 4:
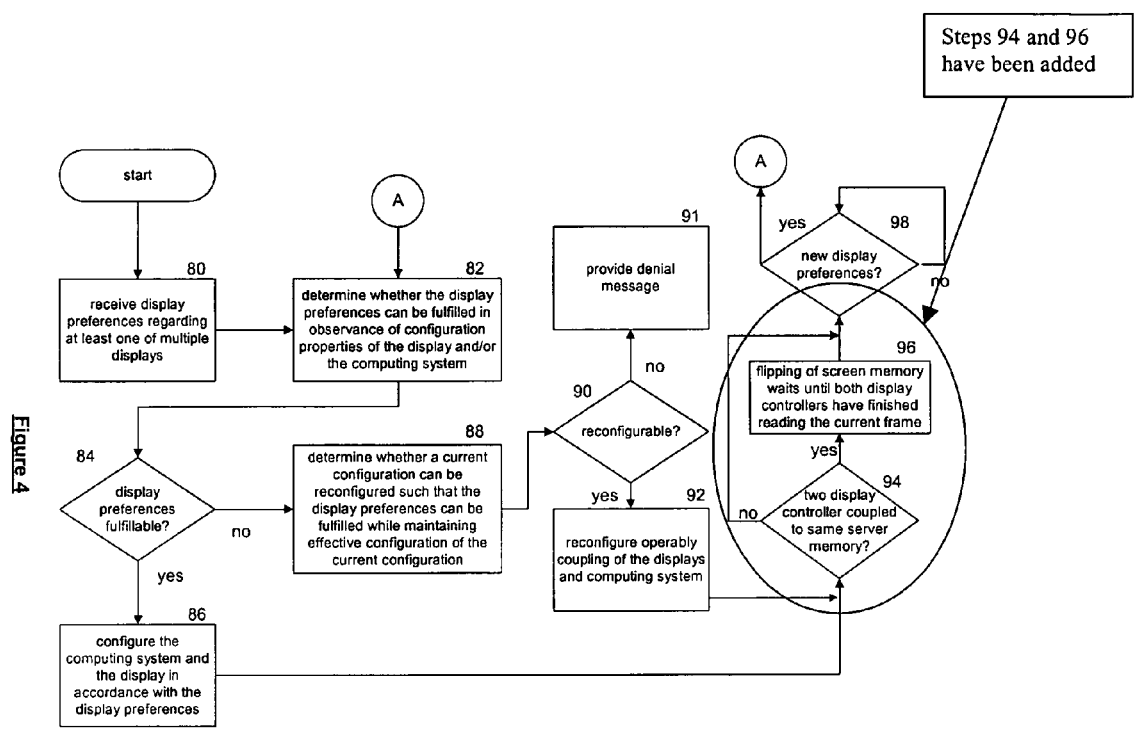
FIG. 4 illustrates a logic diagram of a method for configuring multiple displays associated with a computing system in accordance with the present invention.

FIG. 4 illustrates a logic diagram of a method for configuring multiple displays associated with a computing system. The process begins at step 80 where display preferences are received regarding at least one of the multiple displays. The display preferences may be received from a user via a user interface or from an application via the CPU. In either case, the display preferences provide an image-to-display selection, or selections, such that a particular one of the displays is selected to display a particular image. The process then proceeds to step 82 where a determination is made as to whether the display preferences can be fulfilled in observance with configuration properties of the selected display(s) and/or of the computing system. The configuration properties of the display(s) relate to limitations of the display(s), while configuration properties of the computing system relate to the capabilities of the display controllers and to computing system rules. As previously mentioned, the display controllers may be designed to support a television, an LCD display, a low resolution and/or refresh rate CRT display, a high resolution and/or refresh rate CRT display, and/or to support 8, 16, or 32 bit/pixel display data.

The process then proceeds to step 84 where the answer to step 82 is obtained. If the display preferences can be fulfilled, the process proceeds to step 86 where the computing system and the display(s) is configured in accordance with the display preferences. The configuration may be done in any number of ways. For example, the configuring of the computing system and the display(s) includes operably coupling a display controller of the computing system to the display(s); includes operably coupling the display controller to at least one of the screen memories; includes operably coupling the display controller to at least one of a plurality of display drivers; includes operably coupling a first display controller of the computing system to a first display and operably coupling a second display controller of the computing system to a second display; and/or operably coupling the first display controller to a third display.

If, however, the display preferences cannot be fulfilled, the process proceeds to step 88 where a determination is made as to whether the current configuration can be reconfigured such that the display preferences can be fulfilled while maintaining effective configuration of the current configuration. The process then proceeds to step 90 where the answer to step 88 is obtained. If the current configuration can be reconfigured, the process proceeds to step 92 where the computing system and the display(s) are reconfigured. If, however, the current configuration is not reconfigurable, the process proceeds to step 91 where a denial message is provided.

After the computing system and the displays have been configured or reconfigured, the process proceeds to step 94 where a determination is made as to whether two display controllers are coupled to the same screen memory. If so, the process proceeds to step 96 where the flipping of the screen memory waits until both of the display controllers have finished reading the current frame. The process proceeds to step 98 where a determination is made as to whether new display preferences have been received. If so, the process repeats beginning at step 82. If not, the process processes the present configuration until new display preferences are received.

The preceding discussion has presented a method and apparatus for configuring multiple displays associated with a computing system. With the present invention, the multiple displays may be dynamically configured to display the same images, different images, portions of the same image, the same images with different display properties, and/or a combination thereof. The present invention provides this dynamic configurability from a single video graphics card that includes one or more graphics chips, where each graphics chip includes one or more display controllers. It should be understood that the implementation of other variations and modifications of the invention in its various aspects will be apparent to those of ordinary skill in the art, and that the invention is not limited by the specific embodiments described. Further, any such modifications, variations, or equivalents fall within the spirit and scope of the basic underlying principles disclosed and claimed herein.

What is claimed is:

1. A video graphics processing circuit comprises:
   a processing unit; and
   memory operably coupled to the processing unit, wherein the memory stores programming instructions that, when executed by processing unit, cause the processing unit to:
   (a) receive display preferences regarding multiple displays;
   (b) determine whether the display preferences can be fulfilled in observance of configuration properties of the multiple displays and configuration properties of a computing system, determine whether a current configuration of the multiple displays to the computing system can be reconfigured such that the display preferences corresponding to each of the multiple displays can be fulfilled while maintaining effective configuration of the current configuration when the display preferences cannot be fulfilled;
   (c) configure the computing system and the multiple displays in accordance with the display preferences when the display preferences can be fulfilled, and reconfigure operable coupling of the multiple displays to the computing system such that the multiple displays are configured in accordance with the display preferences when the current configuration can be reconfigured;
   (d) operably couple a display controller of the computing system to the multiple displays, the display controller simultaneously providing display data to the multiple displays;
   (e) operably couple the display controller to a plurality of screen memories, each of the plurality of the screen memories storing separate display data and the display controller retrieving the display data from the plurality of screen memories; and
   (f) operably couple the display controller to a plurality of display drivers, each of the plurality of display drivers writing the separate display data to the plurality of screen memories.

2. The video graphics processing circuit of claim 1, wherein the memory further comprises programming instructions that cause the processing unit to operably couple a first display controller of the computing system to a first display of the at least one of the multiple displays and operably coupling a second display controller of the computing system to a second display of the multiple displays.

3. The video graphics processing circuit of claim 2, wherein the memory further comprises programming instructions that cause the processing unit to operably couple the first display controller to a third display of the multiple displays.

4. The video graphics processing circuit of claim 1, wherein the memory further comprises programming instructions that cause the processing unit to operably couple a first display controller of the computing system to a first display of the multiple displays, operably coupling a second display controller of the computing system to a second display of the multiple displays, and operably coupling the first and second display controllers to one of the screen memory.

5. The video graphics processing circuit of claim 4, wherein the memory further comprises programming instructions that cause the processing unit to operably couple at least two of the multiple displays to one of a plurality of screen memories.

6. A digital storage medium for storing programming instructions that, when executed by a processing unit, cause the processing unit to configure multiple displays associated with a computing system, the digital storage medium comprises:
   first means for storing programming instructions that cause a coupling controller of the processing unit to receive display preferences regarding the multiple displays;
   second means for storing programming instructions that cause the coupling controller of the processing unit to determine whether the display preferences can be fulfilled in observance of configuration properties of the multiple displays and configuration properties of the computing system;
   third means for storing programming instructions that cause the coupling controller of the processing unit to configure the computing system and the multiple displays in accordance with the display preferences when the display preferences can be fulfilled;
   fourth means for storing programming instructions that cause the processing unit to:
   determine whether a current configuration of the multiple displays to the computing system can be reconfigured such that the display preferences can be fulfilled while maintaining effective configuration of the current configuration when the display preferences cannot be fulfilled;
   reconfigure operable coupling of the multiple displays to the computing system such that the multiple displays are configured in accordance with the display preferences when the current configuration can be reconfigured;
   operably couple a display controller of the computing system to the multiple displays, the display controller providing display data to the multiple displays;
   operably couple the display controller to a plurality of screen memories, each of the plurality of the screen memories storing separate display data and the display controller simultaneously retrieving the display data from the plurality of screen memories; and operably couple the display controller to a plurality of display drivers, each of the plurality of display drivers writing the separate display data to the plurality of screen memories.

7. The digital storage medium of claim 6 further comprises means for storing programming instructions that cause the processing unit to operably couple a first display controller of the computing system to a first display of the multiple displays and operably coupling a second display controller of the computing system to a second display of the multiple displays.

8. The digital storage medium of claim 7 further comprises means for storing programming instructions that cause the processing unit to operably couple the first display controller to a third display of the multiple displays.

9. The digital storage medium of claim 6 further comprises means for storing programming instructions that cause the processing unit to operably couple a first display controller of the computing system to a first display of the multiple displays, operably coupling a second display controller of the computing system to a second display of the multiple displays, and operably coupling the first and second display controllers to a screen memory.

10. The digital storage medium of claim 9 further comprises means for storing programming instructions that cause the processing unit to operably couple at least two of the multiple displays to one of a plurality of screen memories.

11. A video graphics processing circuit for displaying at least one image on a plurality of displays, comprising:
a plurality of display controllers included on a single video graphics card;
a plurality of drivers;
memory, wherein at least a portion of the memory is screen memory, the screen memory having a plurality of screen memory portions, each of the plurality of screen memory portions storing separate display data;
coupling module operably coupled to a plurality of displays and the screen memory; and
a coupling controller operably coupled to receive display preferences and operative to determine whether the display preferences can be fulfilled in observance of configuration properties, the display preferences including at least one of displaying an image on more than one of the displays, displaying separate images on each of the displays, displaying a portion of the image on one of the displays and displaying the image on another one of the multiple displays, providing different refresh rates for at least two of the displays, providing different resolutions for at least two of the displays, selecting one of the displays to display a predetermined type of image, and displaying a first portion of the image on a first one of the displays and displaying a second portion of the image on a second one of the displays;
wherein, when the display preferences can be fulfilled, the coupling controller is operative to provide configuration requirements to the coupling module, wherein the coupling module, based on the configuration requirements, operably couples at least one of the plurality of display controllers with at least a portion of the screen memory and with at least one display, a respective display driver of the plurality of display drivers thereby writing respective separate display data to a respective one of the plurality of screen memory portions, and wherein the at least one of the plurality of display controllers retrieves display data from the at least a portion of the screen memory and simultaneously provides the display data to the plurality of displays, and wherein the coupling controller provides reconfiguration requirements to the coupling module when the display preferences cannot be fulfilled but a current configuration of the plurality of display controllers to the at least one display can be reconfigured such that the display preferences can be fulfilled while maintaining effective configuration of the current configuration.

12. The video graphics processing circuit of claim 11 further comprises a graphics engine operably coupled, via the coupling module, to at least one of the plurality of display controllers and at least one of the display drivers.

13. The video graphics processing circuit of claim 11 further comprises a user interface that is operably coupled to the coupling controller and to receive the display preferences from a user.

14. The video graphics processing circuit of claim 11, wherein the memory further comprises properties memory that stores configuration properties of the plurality of display controllers and the at least one display, wherein the configuration properties include at least one of: limitations of the plurality of display controllers and the at least one display and operational rules of the plurality of display controllers and the at least one display.

15. The video graphics processing circuit of claim 11, wherein the configuration requirements cause the coupling module to operably couple a first display controller of the plurality of display controllers to a first display and operably couple a second display controller of the plurality of display controllers to a second display.

16. The video graphics processing circuit of claim 15, wherein the configuration requirements cause the coupling module to operably couple the first display controller to a third display.

17. The video graphics processing circuit of claim 11, wherein the configuration requirements cause the coupling module to operably couple a first display controller of the plurality of display controllers to a first display, operably coupling a second display controller of the plurality of display controllers to a second display, and operably coupling the first and second display controllers to the screen memory.

18. A video graphics processing apparatus for configuring a plurality of displays associated with a computer system, the apparatus comprising:
a common screen memory for multiple display controllers comprising a plurality of screen memory portions, each of the plurality of screen memory portions operative to store display data for the plurality of displays;
a plurality of display controllers included on a single video graphics card, each of the plurality of display controllers operative to retrieve display data from a screen memory portion of the common screen memory and simultaneously provide the display data to at least one respective display associated with a corresponding screen memory portion;
a plurality of display drivers operative to write the display data into the plurality of screen memory portions of the common screen memory;
a coupling module operative to couple to the plurality of display controllers, the plurality of display drivers, and the screen memory, the coupling module comprising means for switching the plurality of display drivers and the plurality of display controllers to appropriate screen memory portions; and
a coupling controller coupled to the coupling module, the coupling controller controlling, in response to configuration properties, operative to access to predetermined screen memory portions by the plurality of display drivers, the coupling controller further operative to control, in response to the configuration properties, coupling of predetermined screen memory portions to the plurality of display controllers, wherein the configuration properties cause the coupling controller to couple a first display driver of the plurality of display drivers to a first and a second screen memory portion of the plurality of screen memory portions.

19. The apparatus of claim 18 wherein the configuration properties cause the coupling controller to couple a first screen memory portion to more than one of the plurality of display controllers.

20. The apparatus of claim 18 and further including a user interface coupled to the coupling controller, the user interface entering display preferences for the plurality of displays.

21. The apparatus of claim 18 wherein the screen memory further comprises configuration memory that stores the configuration properties of the plurality of displays, the configuration properties including at least one of: display refresh rate, display resolution, and type of display.

22. The apparatus of claim 18 wherein the configuration properties cause the coupling controller to couple a first display controller of the plurality of display controllers to a first and a second display of the plurality of displays.

23. The apparatus of claim 18 wherein the plurality of display controllers simultaneously provide the display data to multiple displays.

24. A video graphics processing circuit comprising:
a processing unit; and
memory operatively coupled to the processing unit, wherein the memory stores programming instructions that, when executed by the processing unit, cause a coupling controller of the processing unit to determine whether display preferences regarding multiple displays that display image information at the same time can be fulfilled in observance of configuration properties of the multiple displays and configuration properties of a computing system, and determine whether a current configuration of the multiple displays to the computing system can be reconfigured such that the display preferences can be fulfilled while maintaining effective configuration of a current configuration when the display preferences cannot be fulfilled.

25. A method for configuring multiple displays comprising:
determining, in connection with an image or portion thereof to be displayed on the multiple displays at the same time, whether received display preferences can be fulfilled in observance of configuration properties of the multiple displays and configuration properties of a computing system;
determining whether a current configuration of the multiple displays to the computing system can be reconfigured such that the display preferences of the multiple displays can be fulfilled at the same time while maintaining effective configuration of a current configuration when the display preferences cannot be fulfilled; and
displaying the images or a portion thereof on the multiple displays at the same time.

26. The method of claim 25 comprising switching switches to couple differing screen memories with different display controllers to output display data to the multiple displays for simultaneous display.

27. The video graphics processing circuit of claim 24 wherein the memory includes programming instructions that when executed by the processing unit, cause a coupling controller of the processing unit to reconfigure by dynamically connecting multiple display controllers to differing of the multiple displays for simultaneous display by the multiple displays.

* * * * *